May 28, 1929.  G. N. LOCKE ET AL  1,715,039
DEVICE FOR LIFTING EARS OF CORN
Filed Jan. 20, 1926
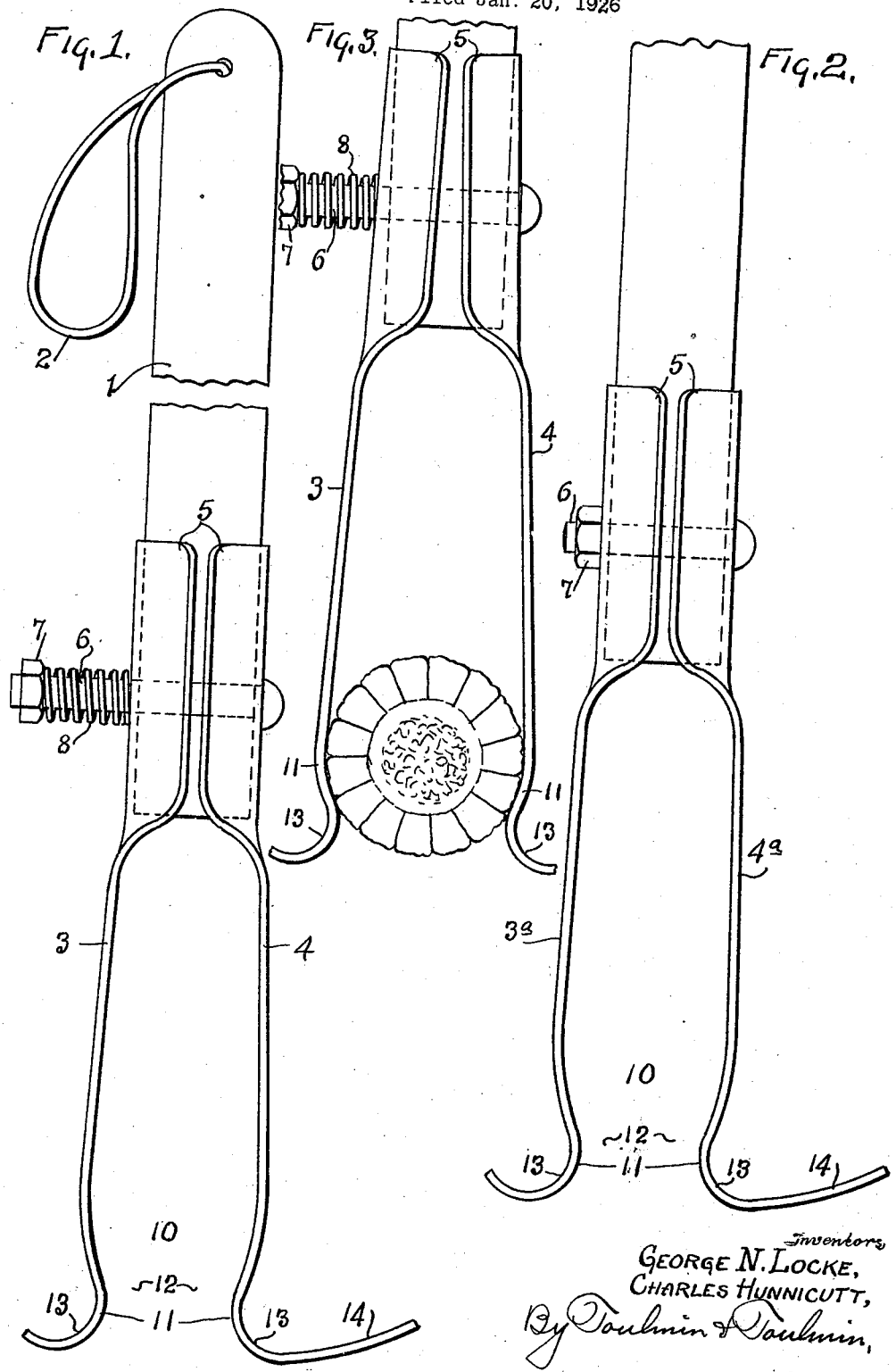
Inventors
GEORGE N. LOCKE,
CHARLES HUNNICUTT,
By Toulmin & Toulmin,
Attorneys Patented May 28, 1929.

1,715,039

UNITED STATES PATENT OFFICE.

GEORGE N. LOCKE AND CHARLES HUNNICUTT, OF WILMINGTON, OHIO.

DEVICE FOR LIFTING EARS OF CORN.

Application filed January 20, 1926. Serial No. 82,426.

This invention relates to an improved device for lifting ears of corn.

It is well known that in the use of corn harvesters many ears of corn are stripped from the stalks and become scattered over the field. The total of such ears is often very large, so that the labor of gathering them is not only considerable in expense for time of farm hands but is most laborious and tiresome, affecting the back particularly by the constant bending over and raising up to gather the scattered ears and toss them into a receptacle or wagon body.

The primary object of our invention is to eliminate this expense to a large degree and to relieve the farm hands from the physical weariness and resulting pain incident to gathering up such corn by hand.

This corn lifter comprises a handle of sufficient length to reach the ears of corn without any stooping effort on the part of the user, and includes "pick-up" members secured to the handle and constituting between them a pocket into which an ear of corn will enter, and where it will be held, when the members are pressed upon the ear and snapped over it. These members have their lower ends flared by turning their material outward, so as to make a suitable throat or entrance for the ear to pass into the pocket. These pick-up members are resilient in character, and one of them has a stalk-lifting extension. The further details of the construction will be pointed out hereinafter in this specification.

In the accompanying drawings:

Figure 1 is a side elevation of my implement in its preferred form;

Figure 2 is a like view of a modified form; and

Figure 3 is a detail view of my preferred form showing the device in operation.

The numeral 1 designates the handle which is of sufficient length to readily extend from the hands of the user to near the ground. At its upper end it is provided with a cord or rope loop indicated at 2, adapted to fit over the wrist to hold the implement while the hands are engaged in removing ears of corn from a stalk lifted by the other end. This other or lower end is equipped with a pair of pick-up members indicated at 3 and 4 in the preferred form, and at $3^a$ and $4^a$ in the modified form. These members are in the nature of resilient blades preferably formed of strips of steel. At their upper ends they are fashioned in the form of plates 5 which embrace the handle, to which they are secured by a bolt 6 which passes through the plates and the handle, in the latter of which it is firmly seated. A nut 7 is applied to the bolt to effect a pressure to cause the plates to be clamped to the handle. In Figure 1, the preferred form, a coil spring 8 is interposed between the nut 7 and the adjacent plate, and in such case the pick-up member 3 may be made less resilient than in the other form because the coil spring is designed to yield to permit the member 3 to spring apart from the member 4, and to be returned to normal by the recoil of the spring 8.

The pick-up members, in their general body, are curved as shown, so as to form a space between them in the nature of a cylindrical pocket as indicated at 10, while the lower portions of the members are bent in position toward each other as shown at 11 to form a throat as indicated at 12 for the entrance and passage of ears of corn as the members are thrust downward over the ears as they lie on the ground. The members yield to widen the throat for the passage of the ear and then the ear is clamped in the pocket-like space 10.

To facilitate the ready entrance of the ear into the throat the members are curved at 13 to form a flaring entrance to the throat. One of the members is extended to constitute a stalk-lifter 14. This projection which functions as a stalk-lifter is designed to be projected under a fallen stalk to enable the user to lift the stalk and strip off the ears of corn without having to bend his body to pick up the stalk with his hands.

Thus it will be understood that in gathering the scattered individual ears of corn as they are found over the field, the user takes the handle of this implement in his hands and places the pick-up members on the ear and pushes them down past it, causing it to readily enter the tapering entrance to the throat 12 and to pass thence into the pocket 10 as indicated in the detail view shown in Figure 3.

When an ear is thus picked up the operator, with the loop 2 on his wrist, will lift the implement with, say his right hand and reach out with the left to extract the ear and throw it into the receptacle or wagon designed to contain the ears as gathered.

When a stalk is down or on the ground as well as the ear, with the ear still in the shuck and adhering to the stalk, the operator will lift the stalk by the stalk-lifter 14 and bring the ear or ears within reach to be stripped off by hand.

Thus our improved implement may be used either to pick up and lift the individual ears or to lift the stalks with the ears attached. In both instances the labor and fatigue of bending over by the operator is avoided, the work more quickly done and the fatigue reduced to the minimum.

It will be understood that we desire to comprehend within our invention such modifications as may be necessary to adapt it to varying conditions and uses.

Having thus fully described our invention, what we claim as new and desire to secure by Letters Patent, is:

1. An implement of the character described comprising a handle, a pair of resilient pick-up members, a bolt extending through the handle and the members, a spring and nut on such bolt, the spring contacting with one of the members to yieldingly hold it against the handle, the body portion of the members being curved outwardly from each other and their outer ends positioned nearer together and curved outwardly at their extremities.

2. An implement of the character described, comprising a handle having a wrist loop at one end, a pair of resilient pick-up members, a bolt extending through the handle and the members, a spring and nut on such bolt, the spring contacting with one of the members to yieldingly hold it against the handle, the body portion of the members being curved outward from each other and their outer ends positioned nearer together and curved outward at their extremities.

3. A corn lifter comprising a handle and two resilient blade members having an opening therethrough, a bolt passing through said opening, a spring mounted upon said bolt to engage one of said resilient blade members and adapted to hold said members in engagement with the handle, each blade being curved toward each other and away from each other at the outer end to form an ear gripping and holding device remote from the handle.

In testimony whereof, we affix our signatures.

GEORGE N. LOCKE.
CHARLES HUNNICUTT.